UNITED STATES PATENT OFFICE 2,622,988

ZEIN INKS

Robert M. Leekley, Westport, Conn., assignor to Time, Incorporated, New York, N. Y., a corporation of New York No Drawing. Application February 23, 1949, Serial No. 78,000

6 Claims. (Cl. 106—24)

This invention relates to improvements in inks for use in high speed printing operations in which quick drying or setting of the ink is required to prevent smudging of the printed matter. It relates particularly to an improved zein-type ink which is characterized by its ability to set to a hardened state without the application of heat to the ink or the printed web.

The great majority of the quick setting or quick drying inks have included a solvent for the coloring agent or a medium in which the coloring agent is suspended or dispersed, the solvent being of such nature that it will not evaporate readily at about room temperature, but will evaporate very quickly at elevated temperatures. These inks are used in printing presses having heating elements for driving off the solvent after the ink has been printed on the web.

Other types of inks have been developed which are caused to set by directing steam against the web and the printed matter thereon to change the moisture content of the ink and cause the binder for the coloring agent to assume an insoluble form.

All of these prior inks have required the alteration of the presses to include a heating or steam generating element in order to make them useful.

Another disadvantage of most of the prior inks, particularly the zein base inks, is that they cannot be prepared from certain types of coloring media or dyes. Thus, for example, the group of red pigments known as phloxine toners cannot be used in inks with certain types of solvents for they change to an undesirable color in the presence of these solvents.

An object of the present invention is to provide inks which will set almost instantaneously at or only slightly above room temperature but which are stable at temperatures only slightly below room temperature, so that they can be used in presses not equipped with expensive heating or steam generating equipment.

Another object of the invention is to provide printing inks of excellent covering power and color which dry quickly to a non-smudging state without the application of heat and which have a high resistance to scratching when fully set.

A further object to the invention is to provide quick setting inks which may utilize inexpensive dyes and/or pigments as coloring media without objectionable color change.

Other objects of the invention will become apparent from the following description of typical forms of inks embodying the present invention.

I have found that all of the above objects can be attained with a zein base ink in which the zein is dissolved in a novel type of water-containing zein solvent which becomes a non-solvent for zein upon reduction of the moisture content of the solvent by evaporation, penetration of the water into the paper or both. The water-containing solvents referred to above include mixtures of water and non-solvents for zein which form azeotropic mixtures with water provided the ratio of water to the non-solvent is less than in the azeotropic mixture. Inasmuch as water has a relatively high vapor pressure even at room temperature and evaporates very quickly at press-room temperatures of 80° or 90° F., and relative humidities below 75% the ink will set almost instantaneously without the aid of any auxiliary heating means on the press. The drying speed is further increased by heat and by turbulent flow of air against the printed surface. These aids to drying are useful, particularly at higher humidities. The ink nevertheless is quite stable when maintained near the dew point of the atmosphere in which the ink is used as by means of water cooling coils and cold water supplied to the rollers of the press. I prefer to keep the rollers slightly above the dew point of the atmosphere because excessive condensation of moisture on the rolls is detrimental to the stability of the ink. As a practical matter I find it undesirable to cool rollers lower than 32° F. and prefer not to cool them lower than about 40° F. Consequently I maintain the dew point of the atmosphere in contact with the inking rollers above 40° F. by humidification when necessary. Satisfactory results have been attained with the rolls as much as about 10° F. above the dew point.

More particularly, I have discovered that many of the glycol ethers and some other related compounds, which are non-solvents for zein in an anhydrous state become excellent solvents for zein when mixed with water. They revert, however, to their non-solvent state when the water content is reduced below a related minimum proportion so that the zein dissolved in these aqueous solvent mixtures or solutions will precipitate very quickly. The water is not retained tenaciously in the ink so that it evaporates or penetrates the paper quickly even at relatively low temperatures as compared to the higher boiling solvents now commonly in use.

Not all of the glycol ethers are suitable for use in inks for the reason that some of them are zein solvents and many of them have boiling points so low that they evaporate with the water, thereby maintaining a balance in the solution which precludes precipitation of the zein. For that reason, the glycols which are non-solvents for zein and having boiling points of about 160° C. or above are preferred. I have prepared inks with non-solvent glycol ethers having boiling points as low as 119° C. However, it is difficult to control the setting time of the inks containing only the lower boiling glycol ethers and they, therefore, are satisfactory only in gravure printing operations.

The critical features of the group of compounds referred to above are; (1) they must be non-solvents for zein when in an anhydrous condition or with only a relatively small proportion of water and (2) their boiling points must be higher than water so that substantially only the water evaporates at about room temperature.

Typical compounds which are satisfactory for use in my new quick-setting inks are:

*Table 1*

Methyl ether of dipropylene glycol
Methyl ether of tripropylene glycol
Ethyl ether of dipropylene glycol
Ethyl ether of tripropylene glycol
Isopropyl ether of propylene glycol
Isopropyl ether of dipropylene glycol
Hexylene glycol (2 methyl-2,4-pentanediol)
Butyl ether of diethylene glycol
Butyl ether of ethylene glycol
Diacetone alcohol All of the above compounds have boiling points of 170° or above and they all are non-solvents for zein when in an anhydrous condition. The first six of these are capable of existence in more than one isomeric form. In these cases the commercially available products which are mixtures of isomers are suitable.

It will be understood that mixtures of the above compounds may be used in conjunction with water for dissolving zein. Also, these compounds may be mixed with lower boiling glycol ethers, for example, methyl or ethyl ethers of propylene glycol, to provide mixed solvents having a boiling point above 170° C. to provide quick-setting inks. The lower boiling point compounds may be used for gravure-type inks.

Many other compounds have been tested in addition to the above-noted group, but these other compounds fail to serve a useful purpose in my inks for the reason that they are either zein solvents or they have boiling points too close to the boiling point of water.

Some of the glycol ethers listed in Table 1 are not suitable for use in making colored inks with some coloring materials, such as, for example, phloxine toners, for the reason that they induce a change in the color of the dye and/or pigment rendering it unsuitable for printing operations. Of the above-listed compounds, diacetone alcohol and 2-methyl-2,4-pentanediol may be used with phloxine toners without imparting a color change to the pigment or the ink.

The proportion of water used in preparing the zein solvent is subject to considerable variation, many of these compounds becoming excellent zein solvents when mixed in widely varying proportions with water. The established tolerances of the compounds for water are as follows:

*Table 2*

| | Limits of per cent of H₂O content |
|---|---|
| Methyl ether of dipropylene glycol | 15 to 45 |
| Methyl ether of tripropylene glycol | 20 to 45 |
| Mixtures of methyl ethers of propylene glycol, dipropylene glycol and tripropylene glycol | (1) |
| Ethyl ether of dipropylene glycol | 20–50 |
| Butyl ether of diethylene glycol | 10–63 |
| Butyl ether of ethylene glycol | 10–58 |
| Ethyl ether of tripropylene glycol | 35–55 |
| Isopropyl ether of propylene glycol | 33–55 |
| 2 methyl-2,4-pentanediol | 10–55 |
| Diacetone alcohol | 10–52 |

¹ Between 10 and 15 to 40.

A typical example of an ink embodying the present invention may have the following composition:

| | Percent |
|---|---|
| Zein | 15.8 |
| 1 - (methyl - methoxy - ethoxy) 2 - propanol with or without a minor proportion of isomers of other methyl ethers of dipropylene glycol | 40.3 |
| Water | 26.9 |
| Carbon black | 17.0 |

This ink printed satisfactorily on a printing press operated at a speed of 1100 feet per minute. At this speed, the prints were dry at the rewind without the use of any heat at all. Immediately after printing, the ink film was soft and could be smudged, but this condition did not cause offsetting and within 5 minutes the ink was hard enough to withstand severe rubbing without smearing. The press was operated with water admitted into the steel rolls of the press at 56° F. The drying was effected with a room temperature of 72° F. and a relative humidity of 53%.

Another ink which operated satisfactorily under similar conditions is as follows:

| | Percent |
|---|---|
| Zein | 15.8 |
| Water | 33.3 |
| 2 methyl-2,4 pentanediol | 33.4 |
| Carbon black | 17.5 |

Both of the above-mentioned inks printed without any tendency to dry on the inking roll as long as the roll temperature was maintained within 5° F. of the dew point. At higher roll temperatures the inks had a tendency to dry at the ends of the inking rolls, but this could be overcome by spraying or dripping a small amount of water on the ends of the rolls.

Another very satisfactory ink contains the same proportions of zein and carbon black in a solvent consisting of 75% of the methyl ether of dipropylene glycol and 25% water.

The methyl ether of tripropylene glycol may be used instead of the methyl ether of dipropylene glycol. Other compounds of the group listed above or their equivalents can be used in similar proportions.

Colored inks can also be prepared as follows: A solution of 60% methyl ether of dipropylene glycol and 40% of water is used to dissolve zein to produce a 19% solution. 25% of the red pigment Red Lake C is mixed with 75% of the zein solution. This ink prints well in high speed preses under the conditions referred to before and hereinafter.

A similar ink containing Benzidine Yellow instead of Red Lake C also printed well and showed no color change due to the presence of the solvent or the zein ink.

A blue ink can be prepared by mixing 70% of the above-referred to zein solution with 30% Peacock Blue.

All of the above-described inks have been tested under normal press-room conditions, for example, at press-room temperatures between about 70° and 85° F., a relative humidity of 40 to 55 and a press speed of 500 or more feet per minute. All of these inks dried quickly without offsetting and the resulting sheets showed good finish. In all of these operations, the steel rolls were cooled with water introduced into the interior of the rolls to maintain them within 5° F. of the dew point. Under these conditions, little, if any, drying of the ink or filling of the rolls occurred. The drying rates of these inks are dependent upon the relative humidity of the surrounding atmosphere so that the inks dry more slowly at higher relative humidities. However, satisfactory quick drying can be obtained at a relative humidity as high as 75.

These inks, when used at press speeds as high as 1100 feet per minute did not show any substantially greater tendency to fly than heat set inks and in color strength and reflective power they are equal to such heat set inks.

It will be understood, of course, that the ink embodying the present invention may be modified further by the addition of other components if desirable. For example, about 2% triethanolamine phosphate may be added to the inks in order to modify and improve their properties.

Moreover, the proportions of water in the solvent mixture may be varied substantially depending upon the tolerance of the selected nonsolvent, the amount of the zein in the ink can be varied between about 10% and 30% and the amount of pigment or dye varied in accordance with the color or tone required. It will be understood that the tackiness of the inks can be varied by regulating the zein concentration.

Also, it may be found desirable to use mixtures of some of the higher boiling compounds with lower boiling compounds in order to provide the most desirable setting operation. Moreover, many of the glycol ethers are actually mixtures of isomers, and these mixtures have proven to be satisfactory. For example, the first six compounds listed in Table 1 have been obtained as commercial products. These, no doubt, are mixtures of the structural isomers in which the isomers having secondary hydroxyl groups predominate.

Inasmuch as the inks are susceptible to considerable modification, the above-described examples of typical inks should be considered as illustrative and not as limiting the scope of the following claims.

I claim:

1. An ink consisting essentially of a 10% to 30% solution of zein in a solvent consisting essentially of about 25% to about 40% water and about 60% to about 75% of a lower alkyl ether of glycol having a boiling point of at least 160° C. which is miscible with water and which is a nonsolvent for zein when in substantially anhydrous state, said solution containing a coloring agent, said ink setting quickly at press room temperatures and at a humidity up to about 75% when printed on a paper web.

2. An ink consisting essentially of about 15.8% zein, about 26.9% water, about 40.3% methyl ether of dipropylene glycol, and about 17% of a coloring agent, said ink setting quickly in the vicinity of room temperature and at a humidity up to about 75% when printed on a paper web.

3. An ink consisting essentially of about 17.5% of a coloring agent, 33.4% of 2 methyl-2,4-pentanediol, 33.3% of water and 15.8% zein, said ink setting quickly in the vicinity of room temperature and at a humidity up to about 75% when printed on a paper web.

4. An ink consisting essentially of about 17.5% of a coloring agent and about 82.5% of about a 19% solution of zein in a solvent consisting essentially of about 60% of methyl ether of diproylene glycol and about 40% of water, said ink setting quickly at room temperature and at a humidity up to about 75% when printed on a paper web.

5. An ink consisting essentially of about 25% to about 30% of coloring agent and 70% to 75% of about a 19% solution of zein in a solvent consisting essentially of 60% of methyl ether of dipropylene glycol and 40% water, said ink setting quickly at room temperature and at a humidity up to about 75% when printed on a paper web.

6. An ink consisting essentially of about 17.5% of a coloring agent and 82.5% of about a 19% solution of zein in a solvent consisting essentially of 75% methyl ether of tripropylene glycol and 25% water, said ink setting quickly at room temperature and at a humidity up to about 75% when printed on a paper web.

ROBERT M. LEEKLEY.

REFERENCES CITED

The following references are of record in the file of this patent:

UNITED STATES PATENTS

| Number | Name | Date |
| --- | --- | --- |
| 2,185,110 | Coleman | Dec. 26, 1939 |
| 2,335,882 | Pingarron | Dec. 7, 1943 |
| 2,360,081 | Stewart | Oct. 10, 1944 |
| 2,433,029 | Coleman | Dec. 23, 1947 |
| 2,436,954 | Denton | Mar. 2, 1948 |
| 2,482,879 | Schmutzler et al. | Sept. 27, 1949 |